Oct. 1, 1968  T. F. SCHWARTZ  3,403,540
MACHINE FOR CUTTING AND FORMING OPPOSED AXIAL CONDUCTORS
OF ELECTRONIC COMPONENTS
Filed Feb. 13, 1967  3 Sheets-Sheet 1

INVENTOR.
THEODORE F. SCHWARTZ
BY
Wm. H. Dean

Oct. 1, 1968     T. F. SCHWARTZ     3,403,540
MACHINE FOR CUTTING AND FORMING OPPOSED AXIAL CONDUCTORS
OF ELECTRONIC COMPONENTS
Filed Feb. 13, 1967     3 Sheets-Sheet 2
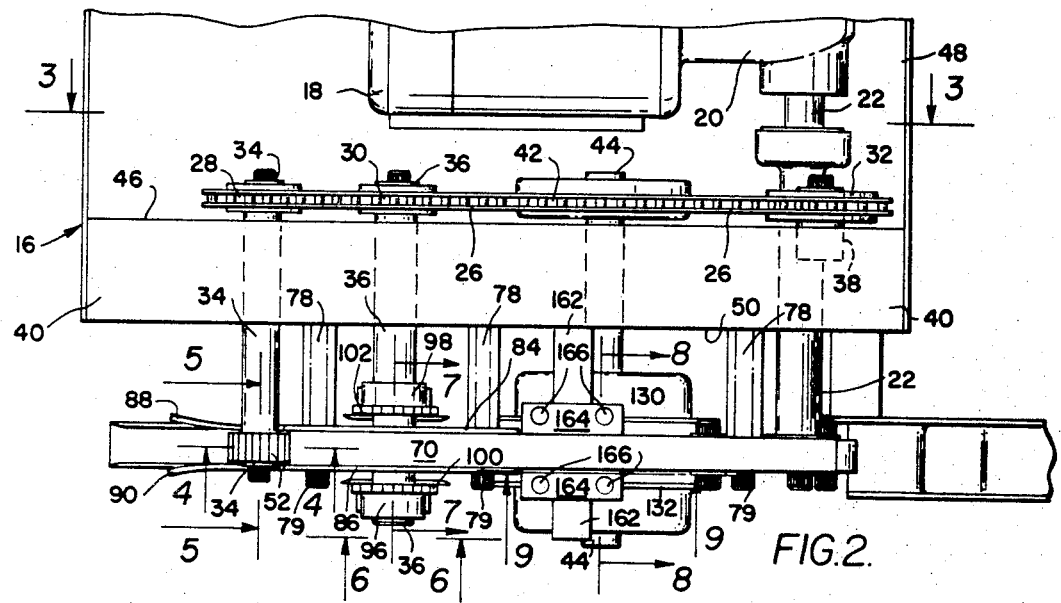
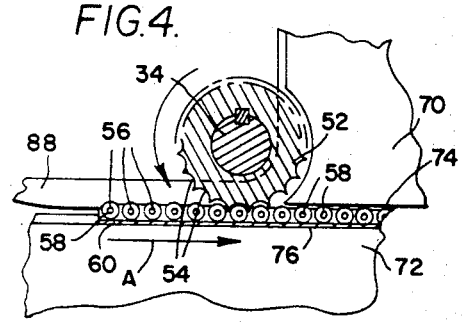
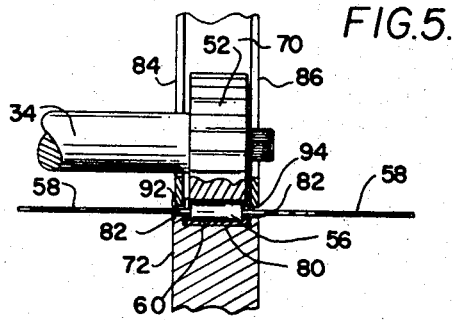
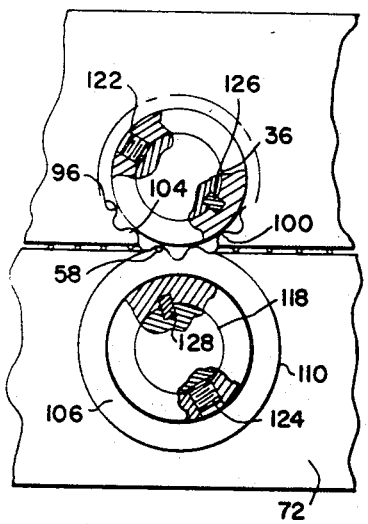
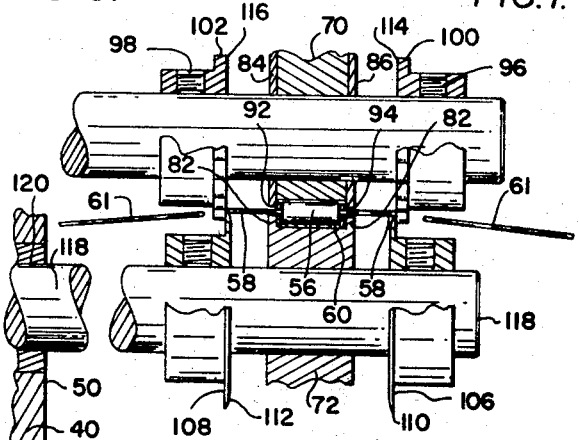
INVENTOR
THEODORE F. SCHWARTZ
BY
*Wm. H. Dean*

Oct. 1, 1968 T. F. SCHWARTZ 3,403,540
MACHINE FOR CUTTING AND FORMING OPPOSED AXIAL CONDUCTORS
OF ELECTRONIC COMPONENTS
Filed Feb. 13, 1967 3 Sheets-Sheet 3
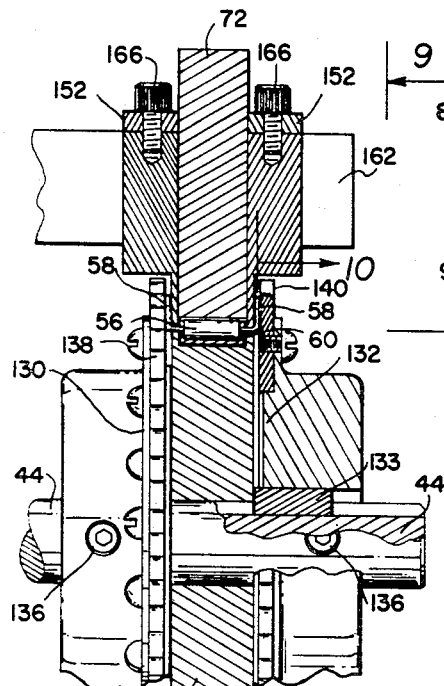
FIG. 8.
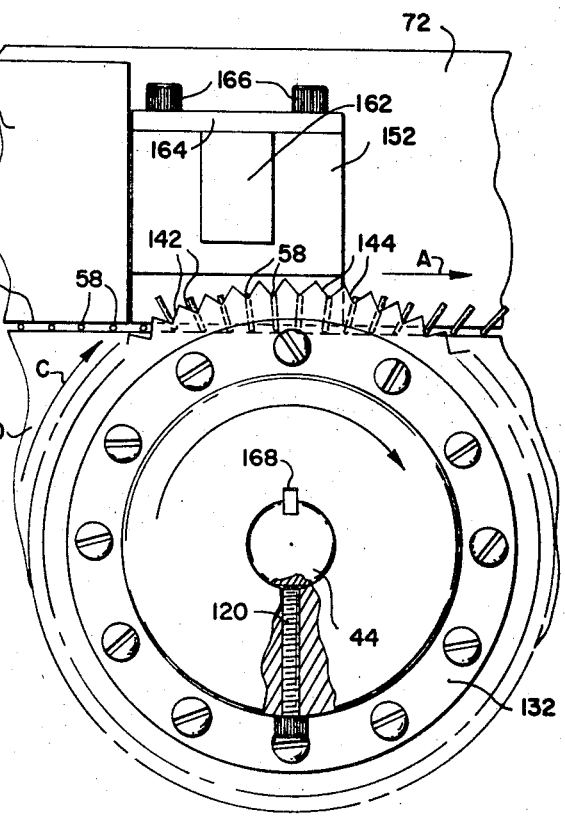
FIG. 9.
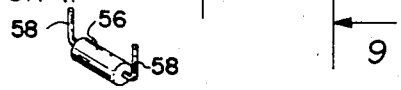
FIG. 14.
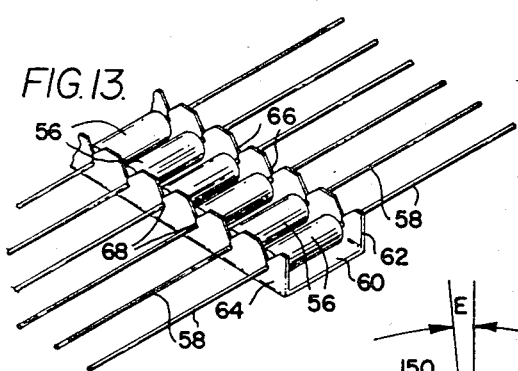
FIG. 13.
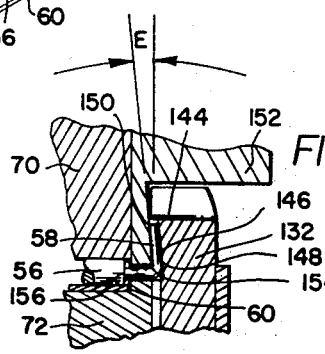
FIG. 10.
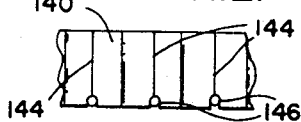
FIG. 12.
FIG. 11.
INVENTOR.
THEODORE F. SCHWARTZ
BY
Wm. H. Dean

United States Patent Office 3,403,540
Patented Oct. 1, 1968

3,403,540
MACHINE FOR CUTTING AND FORMING OPPOSED AXIAL CONDUCTORS OF ELECTRONIC COMPONENTS
Theodore F. Schwartz, 11660 St. Andrews Way, Scottsdale, Ariz. 85251
Filed Feb. 13, 1967, Ser. No. 615,719
9 Claims. (Cl. 72—185)

ABSTRACT OF THE DISCLOSURE

A machine for cutting and forming opposed axial conductors of electronic components which comprises rotary shearing and forming rotors operated in unison successively to shear off opposed axial conductors of electronic components, and to form the conductors at substantially right angles to the axes of the components. The shearing rollers and forming rotors being provided with notched peripheries, the notches engagable with the conductors for advancing them in certain continuity. The valleys of the notch portions of the forming rotors being disposed in offset relation to the axes of the conductors at their juncture with the electronic components, which are held in guides, such that rotary movement of the forming rotors cause the said valleys of said notches to force portions of the electronic components laterally of their axes and to bend them at substantially right angles to the axes of the components, while they are restrained laterally by the said guide means.

BACKGROUND OF THE INVENTION

This invention relates to a machine for cutting and forming opposed axial conductors of electronic components.

In the preparation of electronic components, such as resistors, or the like, for integration into printed circuitry, it is necessary to shear the leads for conductors of the electronic components to a desired length, and then to form them at substantially right angles to the body axis of the components, so that the conductors may readily be inserted through openings in a printed circuit board to be soldered in place in the printed circuit structure. Heretofore, many of the production facilities have been utilizing hand labor to shear the conductors of such components to the desired length, and to form them in angular relation to the body of the component so as to be insertable through openings in a circuit board.

Some prior art machines have been developed for shearing and forming the conductors of electronic components, and these prior art machines have utilized reciprocating shearing mechanisms, as well as reciprocating dies for bending or forming the conductors of the components at substantially right angles to the bodies thereof. Such machines utilizing reciprocating shearing and forming dies have been limited as to rate of production, and have also created shock and bending stresses in close proximity to the emergence of the conductors from the bodies of electronic components, all of which has caused a high rejection rate of the components after the conductors have been sheared and formed. This is due to the fact that bending of the conductors close to the body may fracture the frangible material of the body, and thereby render the component subject to rejection. In the field of electronics, millions of minute electronic components, such as resistors or the like, are used daily, and the cost of labor not only to handle, shear, form, and place these components relative to circuitry boards is very great, and in addition, the cost of rejected parts due to damage has been very high, and consequently, a need has been recognized for a high production machine which automatically and precisely shears and forms conductors of electronic components, such that they may readily be inserted into connection with circuit boards.

SUMMARY OF THE INVENTION

The machine of the present invention employs continuously and synchronously operated shearing and forming rotors, all operating at a continuous linear rate at the peripheries thereof, and wherein the opposed axial conductors of resistors, or the like, may be first sheared off to a desired length, and then formed to substantially right angles with respect to their original axes, and substantially parallel to each other so that they may be precisely inserted in circuitry board openings. Accordingly, it is an object of the present invention to provide a highly efficient, and very productive machine for cutting and forming opposed axial conductors of electronic components wherein rotary shearing and forming rotors means are operated in unison and in continuity with each other for shearing and forming conductors of electronic components.

Another object of the invention is to provide novel means comprising a pair of opposed forming rotors having notched peripheries adapted at their notches to engage axial conductors of components, and wherein the valleys of the notches are disposed laterally relative to guides for the components so as to form the conductors of the components at right angles thereto, as the forming rotors rotate into position to move the valleys of the notches laterally relative to the axes of the components.

Further objects and advantages of the invention may be apparent from the following specification, appended claims and accompanying drawings.

BRIEF DESCRIPTION OF THE DRAWINGS

FIG. 2 is a fragmentary top or plan view taken from the line 2—2 of FIG. 1;

FIG. 4 is an enlarged fragmentary sectional view taken from the line 4—4 of FIG. 2, showing a row of electronic components in the machine of the invention, and showing drive means thereof for propelling the electronic components through the machine;

FIG. 5 is an enlarged fragmentary sectional view taken from the line 5—5 of FIG. 2, showing generally the structure disclosed in FIG. 4 on a different plane;

FIG. 6 is an enlarged fragmentary side elevational view taken from the line 6—6 of FIG. 2, showing portions broken away, and in section, and illustrating a row of component conductors being engaged by the shearing rotors of the invention;

FIG. 7 is an enlarged fragmentary sectional view taken from the line 7—7 of FIG. 2, showing the shearing rotors of the invention, shearing off portions opposed axially extending conductors of electronic components;

FIG. 8 is an enlarged fragmentary sectional view taken from the line 8—8 of FIG. 2;

FIG. 9 is an enlarged side elevational view of the structure shown in FIG. 8, and taken from line 9—9 of FIG. 8;

FIG. 10 is a fragmentary sectional view taken from the line 10—10 of FIG. 8;

FIG. 11 is an enlarged fragmentary sectional view taken from the same plane as FIG. 8, but showing details of the periphery of one of the forming rotors of the invention relative to an axial conductor at one end of an electronic component, and illustrating the forming of the axial conductor into a substantially right angle disposition relative to the axis of the component;

FIG. 12 is an enlarged fragmentary plan view taken from the line 12—12 of FIG. 10;

FIG. 13 is a short row of electronic components having opposed axial conductors engaged and supported in notched flanges of a flexible belt-like member; and FIG. 14 is a perspective view of an electronic component similar to those shown in FIG. 13, but removed from the belt-like member, and showing the conductors thereof sheared off and formed into parallel relationship with each other at substantially right angles to the original axis of the conductors, and the longitudinal axis of the components.

DESCRIPTION OF THE PREFERRED EMBODIMENTS

Figure 1:
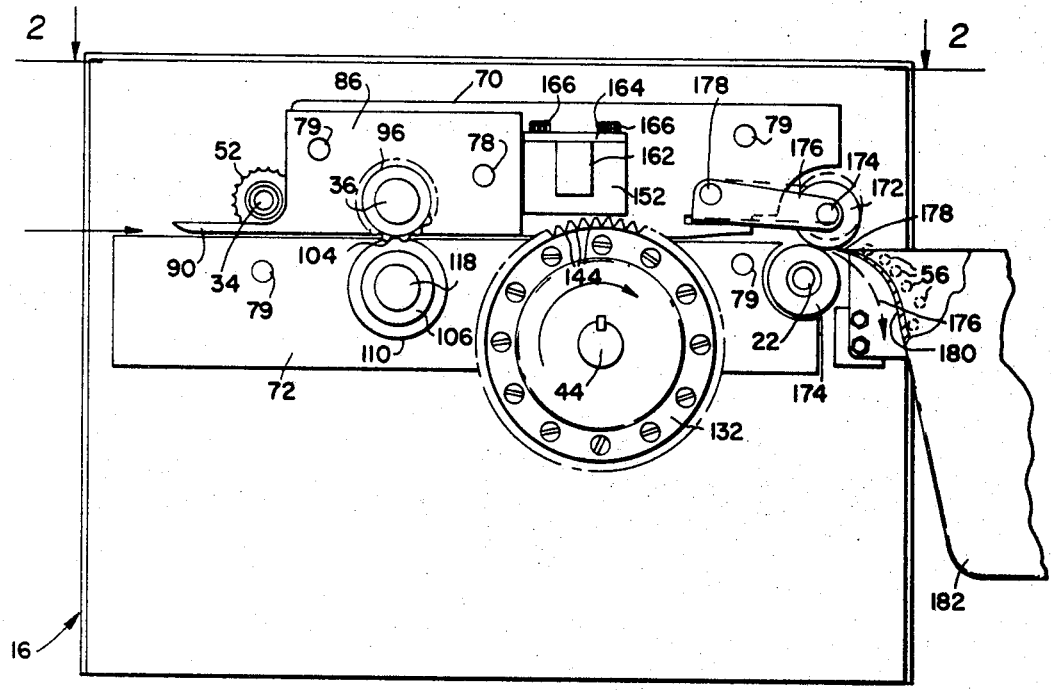
FIG. 1 is a fragmentary side elevational view of a machine for cutting and forming opposed axial conductors of electronic components in accordance with the present invention.
Figure 3:
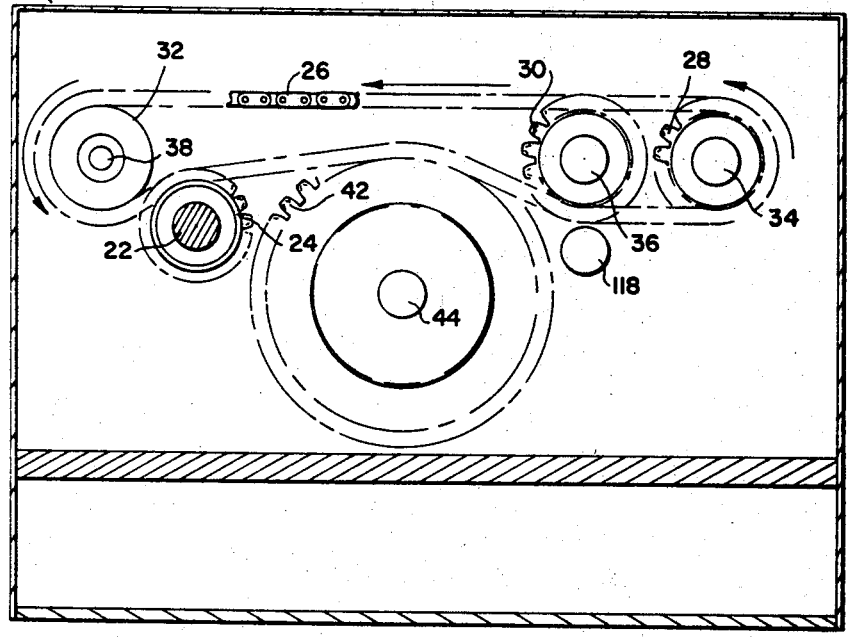
FIG. 3 is a sectional view taken from line 3—3 of FIG. 2.

As shown in FIGS. 1, 2 and 3, the invention comprises a housing and frame structure generally designated 16. This housing and frame structure encloses drive motor 18 having a reduction gear head 20 provided with an output shaft 22 driving a sprocket 24 mounted thereon. A sprocket 24 engages a chain 26, which also passes over sprockets 28 and 30, and an idler roller 32 mounted on shafts 34, 36, and 38, respectively. The shaft 34 is fixed to a bearing block 40 in a frontal portion of the frame housing, and the shafts 34 and 36 are rotatably mounted in the bearing block 40 with suitable end play resisting bearings to hold the shafts against axial movement relative to the bearing block 40. The chain 26 passes over a sprocket 42 mounted on a shaft 44, also journalled in the bearing block 40, and provided with suitable end play resisting bearings to prevent axial shifting of the shaft 44 relative to the bearing block 40. It will be understood that the shafts 22, 34, 36, and 44 all operate in unison, as will be hereinafter described in detail. It will be noted that all of the sprockets 24, 28, 30 and 42, and the roller 32 together with the chain 26 are mounted adjacent a rearward side 46 of the bearing block 40 internally of a hollow housing portion 48 of the housing frame 16. The shafts 34, 36, 44 and 22 project outwardly beyond a frontal side 50 of the bearing block 40, as shown best in FIG. 2 of the drawings.

Mounted on the outwardly extending end of the shaft 34 is a driving rotor 52 having recessed portions 54 in the periphery thereof. These recessed portions 54 are adapted to engage electronic component bodies 56 for driving a row of said electronic components in any direction, as indicated by an arrow A in FIG. 4 of the drawings. These electronic component bodies 56, as shown in FIG. 13, are elongated circular in cross-section cylindrical bodies having axially projecting conductors 58 extending from opposite ends thereof, and in alignment with each other. Resistors, capacitors, and other electronic components may be produced in a configuration similar to those components 56, shown in FIG. 13. For the purposes of operating in connection with the present invention, a substantially channel-shaped in cross-section belt-like flexible member 50 is provided with a pair of angularly disposed flanges 62 and 64 having spaced notches 66 and 68, respectively. These notches 66 and 68 hold the opposed axially disposed conductors 58 for maintaining the bodies 56 of the components in a uniform row, and uniformly spaced to be engaged in the notches 54 of the driving rotor 52 motivated by rotation of the shaft 34, as hereinbefore described.

A pair of guide members 70 and 72 are provided with adjacent guide edges 74 and 76 respectively forming a guide path between which the row of component bodies, and the flexible belt-like member 60 may be driven by rotation of the driving rotor 52. The guide members 70 and 72 are mounted in spaced relation with the front side 50 of the bearing block 40. These guide members 70 and 72 are supported on struts 78 extending outwardly beyond the frontal side of the bearing block 40. The guide member 72 is provided with a channel-shaped in cross-section recess 80 in which the bodies 56 of the electronic components may pass, together with the belt-like member 60, hereinbefore described. At opposite sides of the recess 80 are upstanding flange portions 82, which form supporting bearings for the conductors 58 to prevent undue bending thereof in close proximity to the component body 56, as will be hereinafter described in detail.

Fixed to the guide member 70 at opposite sides thereof are a pair of plates 84 and 86 having respective flared end portions 88 and 90 between which a row of component bodies 56, together with the belt-like member 60 may be inserted to guide the row of components into alignment with the drive rotor 52. Edges 92 and 94 of the plates 84 and 86, respectively, are disposed in closely spaced relation with the flange edges 82, hereinbefore described, and are disposed to be in close proximity to the conductors 58 to assist in the prevention of the conductors from being bent adjacent the component bodies 56, and to thereby protect these bodies from damage, when the conductors 58 are bent, and formed, as will be hereinafter described. These guides 92 and 94 in opposed relation to the flanges 82 prevent undue bending of the conductors 58 in close proximity to the bodies 56, when the conductors 58 are sheared to the desired length by shearing rotors of the invention, as will be hereinafter described in detail.

As shown in FIGS. 1 and 2 of the drawings, bolts 79 secure the guides 70 and 72 to the struts 78, the bolts 79 extend through the guides 70 and 72, and clamping them firmly to the ends of the struts 78 for holding the guides in juxtaposition in spaced relation with the front surface of the bearing block 40 of the machine frame.

The shaft 36, as shown in FIGS. 2, 6 and 7 of the drawings, extends through the bearing block 70, and carries a shearing rotor 96 on the outward side of the guide 70, and another shearing rotor 98 disposed at the rearward side of the guide 70. These shearing rotors 96 and 98 are provided with peripherally notched portions 100 and 102, respectively. These notch portions 100 and 102 may be spaced slightly from the forward and rearward side of the guides 70 and 72, as desired, to shear the conductors 58 at desired locations from opposite ends of the component bodies 56.

The notched portions 98 and 100 comprise notches 104 adapted to engage the conductors 58, as indicated in FIG. 6, and to drive them with relation to sharp edged idler shearing rotors 106 and 108, shown in FIG. 7. These idler shearing rotors 106 and 108 are provided with sharp peripheral portions 110 and 112, respectively, which are disposed in shearing relation adjacent to side portions 114 and 116 of the shearing rotors 96 and 98, respectively. It will be seen from FIGS. 6 and 7 of the drawings, that the peripheral portions 110 and 112 rotate radially beyond the bottoms of the notched portions 104 to shear off the conductors 58, as shown in detail in FIGS. 6 and 7 of the drawings. The idler shearing rotors 106 and 108 are mounted on a shaft 118, which is rotatably mounted in end play resisting bearing structure 120 carried by the bearing block 40, all as indicated best in FIG. 7 of the drawings. Thus, the shearing rotors 96 and 98, when rotated in the direction of the arrows indicated in FIG. 6 of the drawings, tend to rotate the idler shearing rotors 106 and 108, as the conductors 58 are sheared at the sharp peripheral edges 110 and 112. As shown in FIG. 7, excess portions 61 of the conductors 58 are thus sheared therefrom in spaced relationship with the opposite ends of the electronic component bodies 56.

As shown in FIG. 6, the shearing rotors 96 and 106 are secured to the shafts 36 and 118, respectively, by set screws 122 and 124, respectively, and keys 126 and 128 also secure the shearing rotors 96 and 106, respectively, to the shafts 36 and 118, respectively.

It will be seen that the components 56, and the belt-like members 60 move in the direction of the arrow A in FIG. 4, pass toward the shearing rotors 96, 106, and 98 and 108, respectively.

The peripheral speed of the driving roller 52, and the shearing rotors 96 and 98 is equal so that the components 56 are driven, and the components 58 are sheared at a constant linear rate of movement of the components in the direction of the arrow A between the guides 70 and 72.

As the components 56 and their sheared conductors 58 pass beyond the shearing rotors in the direction of the arrow A, the remaining portions of the conductors 58 are engaged by a pair of forming rotors 130 and 132 mounted on the shaft 44, and driven thereby. These forming rotors 130 and 132 are structurally similar, and mounted in opposed relationship to each other on the shaft 44 at opposite sides of the guide member 72, all as shown best in FIG. 8 of the drawings. These rotors are secured to the shaft 44 by means of keys 133 and set screws 136.

The forming rotors 130 and 132 are provided with peripherally notched circular portions 138 and 140. Since these forming rotors are similar, the forming rotor 132 will be hereinafter described in detail.

The peripherally notched portion 140 is provided with a plurality of notches 142 having valleys 144. These valleys 144 are spaced apart a distance equal to the notch portions 68 in the member 60, shown in FIG. 13, and equal to the spacing of the conductors 58 of adjacent components 56. Thus, as the components and conductors 58, together with the members 60 pass into proximity of the forming rotors 130 and 132, the conductors 58 are engaged in the valleys 144 of the notches 142, indicated particularly in FIG. 9 of the drawings. The valleys 144 moving in an arcuate path chordally overlap the guide edges 74 and 76, as indicated in FIG. 9, to intersect and move laterally with respect to the guide edges 74 and 76, and the axes of the conductors 58; said arcuate path being indicated by an arrow C in FIG. 9. Since the component bodies 56 are held in the guide means of the invention against lateral movement, as hereinbefore described, and as will be more fully described. The conductors 58 are deflected in their engagement with the valleys 144 of the notches 142.

Aligned with each valley 144 in the notches 142 is a radially disposed slotted portion 146, these being shown particularly in FIGS. 10 and 11 of the drawings. These notches 146 receive the conductors 58, as they are bent laterally at substantially right angles to the axis of the component bodies 56, and the respective slots 146 in the forming rotors 130 and 132 are parallel with each other so that the conductors 58 extending from each end of the respective component body 56 are maintained in parallel relation to each other.

As shown in FIGS. 8 and 11, the notches 146 are in an interface 148 of the forming rotor 132, and the notches 146 rotate in closely spaced relation to a face 150 of a conductor guide bar 152, the face being slightly tilted angularly with respect to the plane of rotation of the respective forming rotor so as to bend the conductors 58 slightly beyond the 90° limit in order to allow for ultimate springback of the conductors to an angle substantially 90°.

The guide bar 152 is provided with a lower edge portion 154 adapted to provide a bending guide for the respective conductor 58 adjacent one end 156 of the respective component body 56. Thus, as the conductor 58 is bent at right angles by the forming rotor 132, the respective conductor 58 bears against the edge 154 of the guide bar so that the conductor is not deflected at the end 156 of the body 56, and thus avoids damage to the body 156, which may be made of frangible or other similar material which might crack if the conductor is bent in close proximity to the end of the component body.

It will be seen that as the forming rotors 130 and 132 rotate in the direction of the arrow C, disclosed in FIG. 9 of the drawings, that the component bodies 56 are slightly rotated due to retention of the formed conductors 58 in the slots 146, which move radially with respect to the axis of the shaft 44.

It will be seen that the rectilinear path of the component bodies 56, and the conductors 58 are at their axes, follow a line located approximately, as indicated at 160 in FIG. 10 of the drawings, which chordally intersects a peripheral portion of the forming rotors, such that the valleys 144 of the notches 142 pass laterally with relation to the axes of the component bodies 56, and thus progressively bend the conductors 58 into a substantially 90° disposition relative to the longitudinal axes or the original conductor axes of the components.

The guide bars 152 are substantially identical to each other and are located in pairs at opposite sides of the guide members 72, these guide bars 152 are supported on a cantilever supporting member 162 extending outwardly from the bearing blocks 40. The guide bars 152 are adjustable laterally with respect to the guide members 72 in order to properly set the guide portions of these bars with respect to the forming rotors 130 and 132.

These guide bars are secured on the supporting bar 162 by clamp bars 164 secured by screws 166 screw threaded in the respective guide bars 152.

The forming rotors, as shown in FIG. 9, are fixed to the shaft 44 by suitable key structures 168, and set screws 170. Thus, these forming rotors are locked precisely on the shaft 44, such that the respective slots 146 are parallel with each other.

As the forming rotors form the conductors 58 into an approximate right angles disposition relative to the component bodies 56. They proceed in the direction of an arrow A in FIG. 9, together with the belt-like member 60 toward stripping rotors 172 and 174, shown best in FIG. 1 of the drawings. The rotor 172 is rotatably mounted on a pin 174 carried by a bracket 176, which is pivoted to the member 70 by means of a pin 178. This bracket 176 is spring loaded downwardly toward the rotor 174, which is mounted on the shaft 22, hereinbefore described. The rotor 174 is preferably a soft rubber rotor having a high coefficient of friction relative to the belt-like member 60, which is generally made of paper or other suitable material. As the belt-like member and the component bodies 56 pass between the stripping or take-off rotors 172 and 174, the belt-like member 60 follows a path indicated by an arrow 176, while the component bodies 56, together with the form conductors 58, pass above and end portion 178 of a plate 180, which forms a side wall of a component receiving container 182. Thus, the components 56 with the formed lead portions, as indicated in FIG. 14, are stripped from the belt-like member 60, and deposited in the container 182 ready for use by persons inserting those components in connection with conventional printed circuit boards or other electronic circuit means.

It will be appreciated that the roller 174 operates as a take-off rotor, since it frictionally engages the belt-like member 60, and tends to drive it at the same linear speed as does the drive roller 52, the shearing rotors 96 and 98, and the forming rotors 130 and 132.

It will be appreciated that the peripherally notched portions of the forming rotors 130 and 132 are nearly the same pitch diameter as the sprocket 42, and since the chain 26 controls the linear velocity of movement of the row of components through the machine, peripheral movement of the forming rotors matches a linear rate of the row of components between the guide members 70 and 72.

In operation, the row of component bodies 56 carried by the flexible belt-like member 60, as shown in FIG. 13, proceeds at a very rapid linear rate through the machine from the drive rotor 52 through the shearing and forming rotors, hereinbefore described, and to the take-off and separation rotors 172 and 174. It will be understood that since all of the operating components are rotary, and that the component bodies 56 are protected from damage by bearing guides for the conductors 58, as they are sheared and formed, that the operation of the present machine can be very rapid without exerting undue stress on the conductors in close proximity to the ends of the component bodies, therefore avoiding damage thereto, and at the same time, permitting a high rate of speed to be attained in the shearing of the conductors, as well as the forming thereof, and on a continuous basis.

Prior art has already established the arrangement, as shown, in FIG. 13, wherein the electronic components and their conductors are assembled by a machine in the flexible belt-like structure 60, and therefore, the machine of the present invention may operate continuously in accordance with the components and their conductors fed thereinto in connection with the belt-like members 60.

It will be obvious to those skilled in the art, that the channel-shaped in cross-section belt-like member 60 may be omitted from the mechanism, as disclosed herein, so as to permit the component bodies 56 to be in tangent engaged relationship with each other, and in this instance, the notches 54 in the drive rotor 52 will be spaced apart substantially equal to the diameter of each component. Likewise, the notches 104 in the shearing rotors, and the notches 144 in the forming rotors will be spaced substantially equal to the diameter of the components, and the components will be driven compressively in engagement with each other through the guide paths of the machine formed by the edges 74 and 76 of the guides 70 and 72. Accordingly, the component bodies 56 may be fed by means other than the strip or belt-like member 60.

As for example, various hopper means may be provided for feeding the component bodies 56 into the machine between the guides 88 and 90, such that the component bodies 56 are tangent to each other, as they reach the notched portion 74 of the drive rotor 52, shown in FIG. 4 of the drawings. It will thus be appreciated by those skilled in the art that the machine of the invention will operate, as shown, without the belt-like member 60, and with the hereinbefore suggested spacing of the notches in the drive rotor, the shearing rotors, and the forming rotors.

It will be obvious to those skilled in the art that various modifications of the present invention may be resorted to in a manner limited only by a just interpretation of the following claims.

I claim:

1. In a machine for cutting and forming opposed axial conductors of electronic components, the combination of: first means for propelling a plurality of electronic components in a row, such that opposed axial conductors of said components are generally parallel relative to each other, and such that said row of components moves in a first direction laterally relative to the axes of said conductors; a pair of shearing rotors at each side of said first means, said shearing rotors disposed on axes substantially parallel with said conductor axes; each pair of shearing rotors disposed to cut off one of said opposed conductors in spaced relation to a respective electronic component; one shearing rotor of each pair having notches in its periphery, said notches disposed to receive a respective conductor of each electronic component during the shearing thereof; spaced guide means forming a guide path for guiding movement of said components, said guide means disposed to prevent substantial movement of said components in a second direction laterally with respect to said conductor axes, said second direction being at an angle relative to said first direction, said guide means disposed to guide said components relative to said shearing rotors; circular forming rotors disposed to receive remaining portions of said conductors passing from said shearing rotors, said forming rotors having a plurality of notches in their peripheries, said notches adapted to receive and engage said remaining portions of said conductors adjacent axial ends of said components, each of said last mentioned notches having a valley portion adapted to receive one of said conductors, said valley portions disposed to be rotated about the axis of each respective forming rotor in an arcuate path, said notches in a portion of said arcuate path being chordally overlapping said guide path, and thus offset laterally in said second direction relative to said guide path, and to the axes of said component conductors, when said components are restrained in said guide means against movement in said second direction; and power operated means for driving said first means, said shearing rotors and said forming rotors, such that the arcuate distance of movement of such shearing rotors and said forming rotors at their engagement with said conductors are equal, and such that movement of said row by said first means equals said arcuate distance.

2. The invention, as defined in claim 1, wherein: guide bars are disposed adjacent said forming rotors, said guide bars having edges disposed to be engaged by and to support said conductors between said components, and said forming rotors to prevent bending of said conductors contiguous to their respective components.

3. The invention, as defined in claim 2, wherein: said forming rotors are provided with radially disposed slots maintained closely adjacent said guide bars, said radially disposed slots being directed at substantially right angles to the axes of said forming rotors, said slots also disposed to intersect said valleys of said notches, and to receive said conductors when they are forced in said second direction by rotation of said forming rotors.

4. The invention, as defined in claim 3, wherein: said slots, and said guide bars are so disposed that they force said conductors to be bent slightly beyond 90° relative to the axis of said forming rotors to provide for springback of said conductors to an angle of approximately 90° relative to the normal conductor axes of said components.

5. The invention, as defined in claim 4, wherein: shaft means mounts said shearing rotors, and said forming rotors; and means adjustable mounting said shearing and forming rotors on said shaft means to permit spreading apart or moving closer together said pairs of forming rotors relative to each other, and to likewise permit relative spreading apart, and moving closer together said shearing rotors, whereby components of varying axial lengths may be handled by said machine during the shearing and forming of the conductors of said components.

6. The invention, as defined in claim 1, wherein: said first means comprises a belt-like channel-shaped in cross-section flexible means having opposite edge portions provided with notches in which said opposed conductors are held; and said first means, including a driving rotor having notches in its periphery disposed to receive and engage said components for moving said row and said flexible member in said first direction.

7. The invention, as defined in claim 6, wherein: a pair of opposed take-off rotors are driven by said driving means, and disposed to engage said flexible means therebetween for assisting in the propulsion of said row through said machine in said first direction of movement beyond said forming rotors.

8. The invention, as defined in claim 7, wherein: a separation plate means is directed toward and disposed adjacent said take-off rotors, said plate having an end directed generally toward said takeoff rotors in approximately a tangent relation to both said opposed rotors, said end disposed to be between said components, and said belt-like member to separate the components, and belt-like member, when the belt-like member and components are moved relative to said end of said plate by said take-off rotors.

9. The invention, as defined in claim 8, wherein: means is provided adjacent said separator plate for receiving said components from said separator plate, as the components are separated from said belt-like means.

References Cited

UNITED STATES PATENTS

| | | | |
|---|---|---|---|
| 2,777,477 | 1/1957 | Zimmerman | 140—71 |
| 3,375,857 | 4/1968 | Berg | 140—71 |

CHARLES W. LANHAM, *Primary Examiner.*

L. A. LARSON, *Assistant Examiner.*